UNITED STATES PATENT OFFICE.

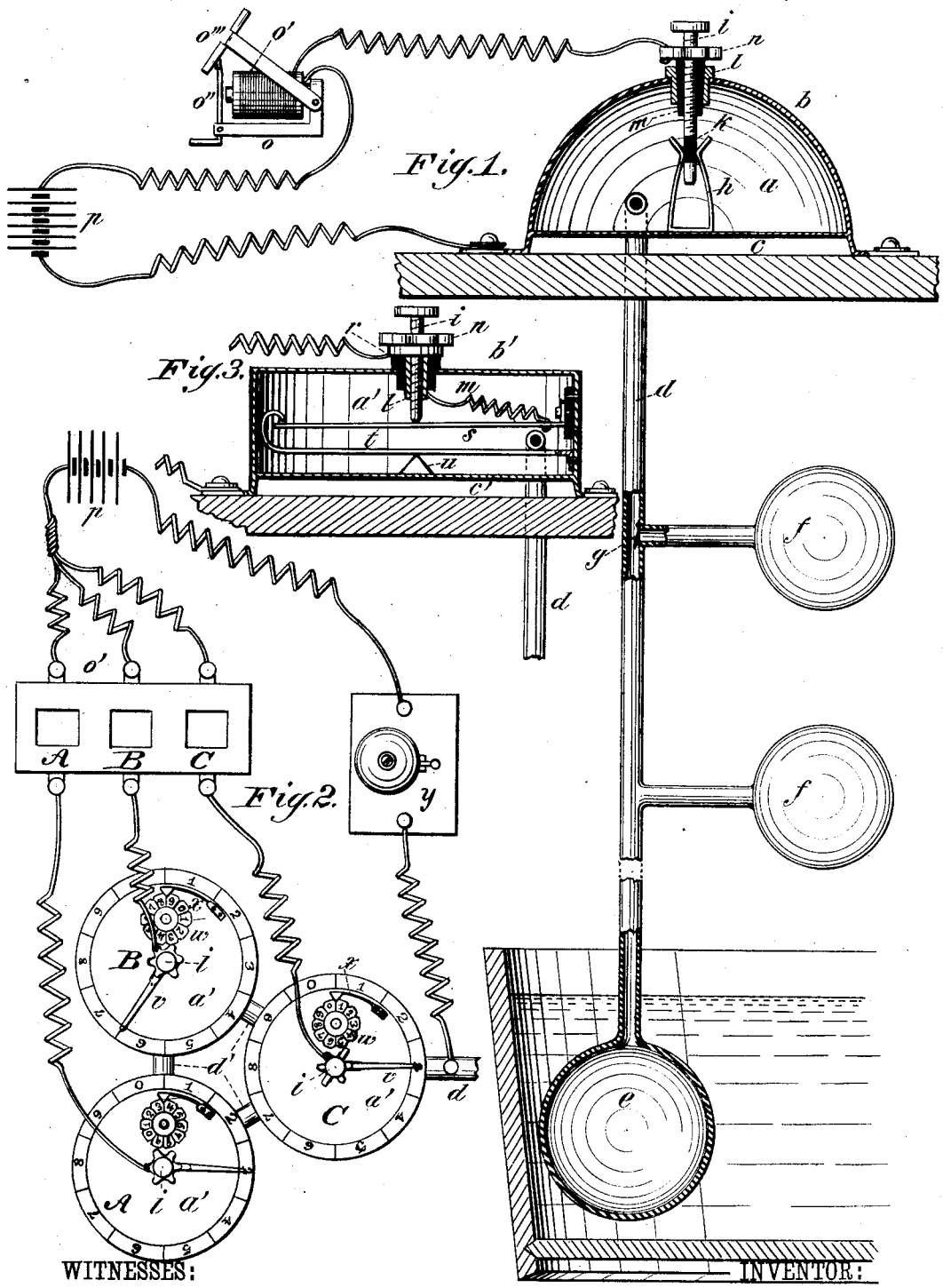

ADAM LÜNGEN, OF NEW YORK, N. Y., ASSIGNOR OF ONE-HALF TO ROBERT EDWARDS, OF SAME PLACE.

HEAT-INDICATOR.

SPECIFICATION forming part of Letters Patent No. 243,345, dated June 21, 1881.

Application filed March 10, 1881. (No model.)

*To all whom it may concern:*

Be it known that I, ADAM LÜNGEN, of New York city, New York, have invented certain new and useful Improvements in Heat-Indicators, of which the following is a specification.

My invention aims to provide a sensitive and efficient electro-pneumatic thermostat to serve as a detecter and alarmer of fires or unusual temperatures, and also to act to indicate any desired degree or culmination of temperature at a distance from its source, for use in the various manufacturing arts as an indicating or regulating thermometer.

To this end the main feature of my invention may be stated to consist in an instrument formed of an inclosed expansible vessel or case containing a sealed body of air, and having one or more flexible or expansible sides, with electrodes sustained upon and relatively adjusted upon said case and arranged in relation with said side or sides, and in circuit with a source of electricity, and an electric indicating or announcing device, whereby the expansion or contraction of the vessel due to a rise or fall of temperature causes the electrodes to close or break the circuit, and thus give an alarm or indication.

My invention also consists in the special construction and relative arrangement of the parts of my improved instrument, as hereinafter fully set forth.

Figure 1 of the annexed drawings is a sectional elevation, representing my improved instrument as a heat-indicator and fire-alarm. Fig. 2 is an elevation representing a number of my instruments set to different temperatures grouped together and connected with a suitable annunciator, &c. Fig. 3 presents a sectional view of a modification.

In Fig. 1, *a* indicates a hollow expansible vessel or case containing a sealed body of air, and having one or more of its sides flexible and capable of expansion and contraction. The vessel is best made of thin sheet metal, preferably ordinary sheet tin or brass, and in Fig. 1 the upper and main portion, *b*, of the vessel is of dome or bell shape, and is designed to be rigid throughout, while the lower part or bottom, *c*, is made very thin and flat or slightly curved, so as to be quite flexible and capable of being readily bulged outward or inward, according as the contained air expands or contracts by changes of temperature.

*h i* indicate two electrodes or terminals of an electric circuit, which are adjustable to or from each other, and so arranged relatively to the expansible case that when the same expands to a certain extent, corresponding to a definite temperature to which the device may be set, the said electrodes contact, close the circuit, and cause an annunciator, *o*, or an electric bell or equivalent electrical indicating or announcing device in said circuit, to act, and thus give an alarm or indication and make known the fact that a certain temperature has culminated or that a fire has started. This constitutes, so far as described, the main portion of the devices, the advantage of this device being that as the motion necessary to close and break the electric circuit is obtained by the expansion of air in a sealed elastic or expansible vessel, a very sensitive and reliable electro-thermostat is thus produced, for the air is very sensitive to changes of temperature, and expands considerably and with considerable force for slight increases of temperature, thus rendering the circuit-closing action more positive and certain.

I do not, of course, broadly claim an expansible case with electrodes for the purpose described; but I have, however, devised a special and advantageous form and arrangement of these parts, together with certain other accessories, whereby the value of the device is greatly increased, and it is adapted for many purposes in the manufacturing arts as a regulating-thermometer, as well as a distant heat-indicator and fire-alarm.

It may be therefore observed from Fig. 1 that the electrode *i*, which is adjustable to or from the opposite electrode, *h*, is hence made in the form of an adjusting-screw for this purpose, and screws through an insulating-sleeve, *m*, fixed in a bushing, *l*, in the rigid dome *b* of the case. The milled head of the screw projects from the exterior of the case, where it is readily accessible for adjustment, while the point projects within the case and engages with the opposite electrode, *h*, which is made in the form of two spring-jaws, which clasp the screw on opposite sides, and thus keep the same in steady and central position, which spring-jaws are fixed permanently on the flexible bottom *c* of the case or vessel *a*, as illustrated.

A portion of the screw *i* is covered with an insulating-sleeve, *k*, near the point, which insulator normally or while the case is contracted lies in contact with the opposite electrode, *h*, thus breaking the circuit; but when the case becomes subjected to a temperature for which it is set to detect the contained air expands, bulges the flexible side *c*, and causes the spring *h* to ride over the insulator *k* and make contact with the conducting-tip of the screw, thus closing the circuit with a battery, *p*, or other source of electricity, and with an annunciator or alarming device, *o*, in said circuit. The device *o* illustrated is an existing form of annunciator, in which the magnet *o'*, when circuited, attracts the pawl-armature *o''* and allows the indicator *o'''* to drop. In lieu of this device, any other indicating or alarming device may be used—for instance, a galvanometer and an electric bell, either or both. One of the circuit-wires, as illustrated, connects directly to the case *a*, which is in metallic connection with the electrode *h*, while the other wire connects to the jam-nut *n* on the screw *i*, which is insulated from the case by the sleeve *l*.

It may now be readily observed that by adjusting the screw *i* farther in or out to or from the springs *h* the degree of expansion necessary to close the circuit may be reduced or increased, so that the device may thus be set by this adjustment of the screw *i*, so as to close the circuit and thus give an alarm or indication at any desired temperature, and by tightening up the jam-nut *n* the screw will be firmly retained at this adjustment.

It may be further noted that by the construction and arrangement shown the electrodes are inclosed within the case, and are thus thoroughly protected from mechanical injuries, from severe oxidations, or from deposits of dust or other matter which would interfere with their functions and which would occur if the same were exposed. The thermostats or cases *a a* may hence be placed in various parts of a building, attached to the walls or ceilings, or in the hold of a ship, attached to the decks or sides or to parts of the cargo, without fear of any derangement of the electrodes, each instrument being properly circuited, as before described, and should any dangerous temperature arise in the location of any instrument it will at once act to close the circuit, with the annunciator arranged, say, in the office of the building or the cabin of the ship, &c., thereby giving instant notice of danger and showing its location, so that the device thus serves as a most efficient fire-alarm or a detecter of incipient combustion before conflagration actually occurs, and enables the same to be reached and subdued before serious harm can take place, thereby proving of great value for many purposes.

In most cases it will be best to distribute the thermostats *a a* at frequent intervals throughout the space to be protected from fire, all being preferably in one electric circuit, each instrument in connection with a distinct annunciator, which, when circuited, will show the location at which the circuit has been closed, as just described, and partly illustrated in Figs. 1 and 2; but in some cases but one instrument or thermostat, *a*, may be placed, say, centrally in the space to be protected, and from the hollow case thereof a fine pipe, *d*, Fig. 1, may be extended in various directions therefrom, or, say, around the limits of said space, with thin inflexible bulbs *f* branching from this pipe at intervals and opening into the main pipe *d* by orifices provided with outwardly-opening valves *g*. Hence, if any one of these bulbs becomes heated by a dangerous rise of temperature in its vicinity its contained air will expand, and, communicating its pressure through the pipe *d* to the flexible sides *c* of the thermostat *a*, it will expand the same, and thus close the circuit and give the alarm. By the arrangement of valves between the bulbs and main pipe it will be observed that the expansion in any one bulb will hence be communicated only to the case of the thermostat, and not to any other bulb, and hence its action will be concentrated on the thermostat, and not dissipated by diffusion in the other bulbs. I prefer to have the bulbs *f*, of course, of a large size—much larger than the thermostat *a*—so as to make their action effective, and not smaller than the same, as illustrated, for convenience, in Fig. 1.

It may now be readily appreciated that, besides serving as a fire detecter and alarm, the same device exhibited in Fig. 1 may be used as a thermometer to indicate the culmination of certain temperatures at a distance from their source. Thus, for indicating the temperature of brewers' vats, maltsters' ovens, refrigerating-houses, drying-rooms, &c., the instrument may be used with great advantage, for the battery and annunciator may be conveniently placed in the office, while the thermostat *a* may be placed as near as convenient to the source of temperature to be indicated, while the pipe *d*, extending from the case, may be terminated with a bulb, *e*, which may enter the vat, as illustrated, or other chamber, as circumstances demand, (the bulbs *f* and valves *g* being, of course, dispensed with;) hence, when the critical temperature for which the instrument is adjusted is reached, both a visible and audible indication thereof will be at once given in the office, which, for many purposes, will be most desirable and important.

This device may also be used to regulate the heat or cold acting on the distant bulb, so as to keep it at a uniform temperature—say by means of an electro-magnet, which, when thrown into circuit, will act to close a damper or shut off the source of heat or cold, and, when thrown out of circuit, will restore the flow of heat or cold.

For some purposes a number of thermostats may be grouped on the same pipe *d*, and each set to a different temperature, representing, say, successive stages of heat, as illustrated in Fig. 2, the thermostats A B C being each in separate circuit at one terminal with distinct portions A B C of an annunciator, o', but all in circuit at the other terminal with the battery p and an electric bell or alarming device, y, as illustrated. Hence as the successive temperatures are reached the thermostats corresponding to said temperatures will successively close the circuit, give an alarm, and trip the annunciator corresponding thereto, and thus indicate the fact, as will be readily understood. If the thermostats are all on the same circuit, as shown in Fig. 2, each one, as soon as it becomes circuited and sounds its alarm, may be switched out of circuit, so as to allow the next one to act; but if each thermostat is placed in a separate circuit, this switching will not be necessary.

In Fig. 2 I have represented the thermostat as graduated and provided with indexes, whereby they may be visibly set to any desired temperature in a simple manner. Thus a radial index-finger, v, projects from the head of the adjusting-screw i, and is rotatable around the graduated periphery of the case, graduated, say, into ten unit degrees. This screw is also provided with one projecting tooth, which once in its revolution engages a toothed wheel beneath a disk, w, which is pivoted to the top of the case, adjacent to the screw, and thereby turns said disk the space of one of the teeth of its wheel, which are ten in number, corresponding to the ten graduations on its face, which represent tens in numeration, while the graduations on the periphery of the case represent units. An indexing-pawl, x, fixed to the case engages with V-notches at each graduation of the disk w, and thus serves as an index-finger for said disk, and at the same time holds it in definite position and insures a true register of the parts.

In Fig. 3 the thermostatic case a' is made in the form of a short or flat cylinder, its sides being rigid, while its two heads b' c' are flexible and expansible, so that nearly a double motion is produced for the same temperature as compared with the case in Fig. 1. In this modification, furthermore, the adjusting-screw i contacts with the middle of a lever-spring, s, within the case, but insulated therefrom, while a second lever-spring, t, connected to the case, lies parallel to the first, bears upon a fulcrum or knife-edge, u, fixed to the center of the expansible head c, and has its outer end bent to overlie and approach the end of the spring s. These springs hence constitute the terminals of the circuit, and it will be readily observed by this arrangement that the motion between these terminals will be nearly quadruple what it would be in the case of Fig. 1, thus producing an instrument of greater range and sensitiveness.

In Fig. 3 the upper circuit-wire connects to a washer, r, underlying the jam-nut n, which is preferable to its connection with the jam-nut itself. A conducting-wire extends from the adjusting-screw or from its metallic nut to the spring s, to make the conduction more perfect and independent of the contact of the point of the screw with the spring, as will be understood.

It may be readily understood that the electrode i may be made adjustable to or from the electrode h without being in itself a screw; but a screw is preferable.

It may be readily understood that, in lieu of charging the thermostat with air, any other gas may be used, or a small quantity of volatile fluid in combination with the air or gas, to give greater expanding power.

What I claim is—

1. An electro-pneumatic thermostat composed of a hollow expansible case charged with a confined body of air and adapted to be placed in fixed position, with electrodes sustained upon the case and arranged in operative relation with the expansible sides thereof, and adjustable to or from each other upon the said fixed expansible case, substantially as and for the purpose set forth.

2. In an electro-pneumatic thermostat, a hollow expansible case charged with a confined mass of air, in combination with electrodes arranged in operative relation to the expansible side or sides of said case, with their approaching ends inclosed within the case, substantially as and for the purpose set forth.

3. In an electro-pneumatic thermostat, a hollow expansible and closed case charged with air, in combination with electrodes arranged in operative relation to the expansible side or sides of the case, one of said electrodes being adjustable to or from the other, and arranged with its adjusting end exterior to the case and its contact end inclosed within the case, together with the opposite electrode, likewise inclosed, substantially as herein shown and described.

4. In an electro-thermostat, the electrode i, provided near the contact-tip thereof with an insulating-covering, k, in combination with the opposite electrode, h, arranged to contact laterally with the first electrode and break or close circuit therewith sooner or later by its movement from said insulating to said conducting portion, substantially as and for the purpose set forth.

5. An electro-pneumatic thermostat, thermometer, or fire-alarm composed of a hollow expansible and closed case charged with air, electrodes arranged in operative relations to the expansible sides of said case and adapted to be placed in circuit with a source of electricity, and an electrical alarming or indicating device with a tube or duct extending from said closed expansible case, and a closed air-bulb attached to said tube at more or less distance from said case, substantially as and for the purpose herein set forth.

ADAM LÜNGEN.

Witnesses:
CHAS. M. HIGGINS,
WILLIAM WEBB.